Aug. 5, 1952     L. E. JONES     2,606,048
REARVIEW MIRROR HEAD
Filed April 2, 1949
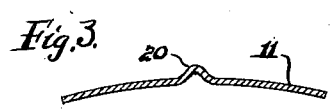
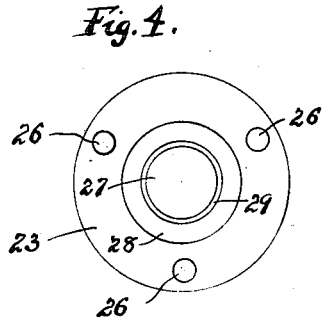
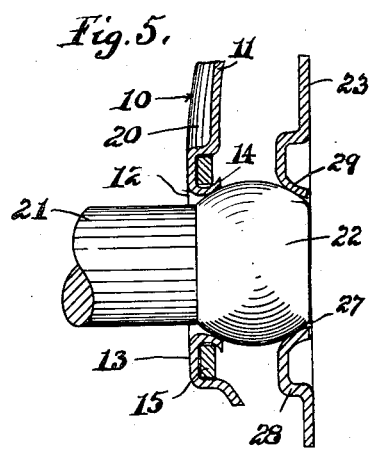
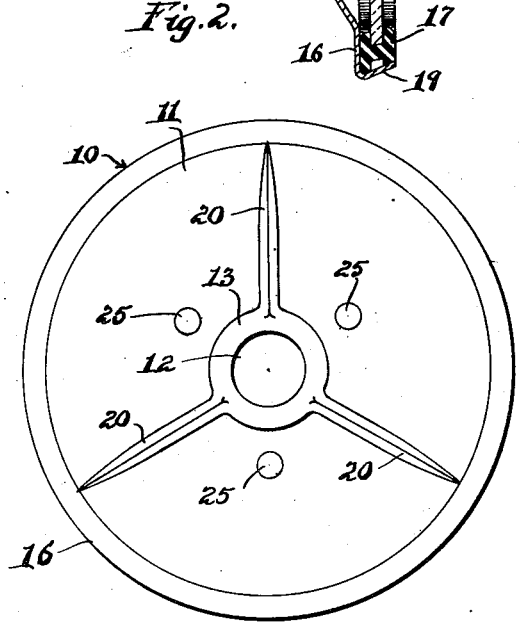
INVENTOR.
Livingston Eric Jones
BY
W. W. Williamson
Atty.

Patented Aug. 5, 1952

2,606,048

UNITED STATES PATENT OFFICE 2,606,048

REARVIEW MIRROR HEAD

Livingston Eric Jones, Philadelphia, Pa.

Application April 2, 1949, Serial No. 85,202

4 Claims. (Cl. 287—21)

My invention relates to a rear view mirror head and introduces the combination of the head crown construction, the mirror assembled therein, a supporting post and the means for adjustably connecting the head with said post.

One object of the invention is to construct the head crown or shell in a manner to provide maximum strength and rigidity from metal of relatively light weight.

Another object of the invention is to form the head crown or shell with a bearing of unique construction and having ribs radiating from said bearing, said ribs being angular in cross section and constricted at their outer ends, all combined to add strength and symmetry to the finished article.

A further object of this invention is to provide a circular clamping plate coacting with a ball on a supporting post and combining effectively with the head bearing to adjustably connect the head to the supporting post.

A still further object of the present invention is artistic effect, the embodiment of the various elements, including the bearing and radiating ribs, into an object of beauty. In the unit as herein disclosed all of the elements are not only functionally coactive, but also integrated as a piece of craftsmanship, a shapely thing expressing a mood in artistic composition, so much desired by owners of automobiles.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawing forming a part hereof, in which:

Fig. 1 is a sectional elevation of a mirror head constructed in accordance with my invention and a supporting post on which it is swiveled.

Fig. 2 is a rear face view of the head crown or shell, on a reduced scale.

Fig. 3 is a fragmentary sectional view on the line 3—3 of Fig. 1.

Fig. 4 is a face view of the clamping ring.

Fig. 5 is an enlarged fragmentary portion of Fig. 1 to plainly illustrate details of construction.

In carrying out the invention as herein embodied 10 represents the rear view mirror head, as a whole, including the head crown or shell 11 produced from sheet metal and fashioned into generally saucer shape to present a circular formation in plan and concavo-convex in diametrical section.

At the center of said shell is a relatively large hole 12 surrounded by a hollow annular stamped up rib 13 having the inner flange 14 thereof projected inward relative to the balance of said shell. Within the chamber of said annular rib is mounted a reinforcing ring 15, solid in cross section, and the edge of the flange 14 is slightly turned over said ring 15 to retain the latter in place. The inner flange 14 provides a race or part of a socket for a ball, to be later described, and the ring 15 reinforces said flange 14 sufficiently to prevent said flange being damaged under constant use of the appliance.

The outer edge of the shell is bent outwardly to provide a flat annular rim 16 constituting a seat in a place at right angles to the axis of said shell, which seat receives the gasket 17, described in my co-pending application, to hold the mirror 18 and said gasket is held in place by the inwardly canted annular flange 19 projecting outwardly from the outer circumference of the annular rim 16.

Several radial ribs 20, substantially angular in cross section, Fig. 3, project from the annular rib 13 outwardly towards and to or substantially to the rim 16. The radial ribs are, preferably, three in number, equidistant apart and stamped from the concavo-convex portion of the shell to protrude from the outer surface of said shell. Said radial ribs are the same height at their inner ends as the annular rib 13 and gradually decrease in height towards their outer ends where they blend with the outer surface of the shell. The outer end portions of said radial ribs also gradually decrease in width to the outer extremities so that the outer ends are constricted.

A supporting post 21 of any desirable length and general configuration has a ball 22 on one end. This ball is clamped between the race formed by the inturned flange 14 and a clamping ring or plate 23 by screws 24 projected through holes 25 in the shell and screwed into the threaded holes 26 in said clamping ring. The clamping ring or plate 23 is formed with a large central hole 27 and a stamped up channeled rib 28 surrounding said central hole. The inner circumferential flange 29 of said rib 28 provides or constitutes a companion race or another part of the socket for the ball 22 whereby the mirror head is swiveled to the supporting post for universal angular adjustments.

The supporting post 21 is provided with any suitable means for attaching it to some part of an automotive vehicle and, for purposes of illustration only, said post is herein shown as having a threaded stem 30 on which is mounted a washer 31 and a nut 32. By loosening the screws 24 the pressure upon the ball will be relieved and the head may be readily and easily adjusted to any desired angle after which the screws may again be tightened to firmly retain the adjustment. Also, if desired, the clamping plate or ring can be adjusted to merely snugly fit the ball permitting the head to be swung about by hand without touching the screws.

From the foregoing it will be apparent that I have provided a strong and durable construction of rear view mirror head having means to permit a wide range of adjustments and all of the elements combined to produce an article of beauty and symmetry which will enhance the appearance of any vehicle on which it is installed.

Of course I do not wish to be limited to the exact details of construction as herein shown and described as these may be varied within the scope of the appended claims without departing from the spirit of my invention.

Having described the invention what I claim as new and useful is:

1. In combination, a post having a ball on one end, a rear view mirror head shell of general saucer shape and having a hole and openings therein, an annular channelled rib struck up from said shell and surrounding said hole, the inner flange of said rib forming a race to engage said ball, a reinforcing ring of solid cross section located in the channel of said annular rib, a clamping plate having a hole and openings therein, a channelled rib surrounding said hole in said plate and the inner flange thereof forming a race to engage said ball, and screws projected through said openings in the shell and threaded into said openings in the clamping plate whereby the ball may be adjustably secured between the two races.

2. In a device of the kind described, a concavo-convex shell having a large central hole, a channelled annular rib projecting outwardly from said shell and surrounding the hole and including an inner flange having its free edge flared outwardly to partially close the rib channel and form a race, a clamping plate having a central hole, a channelled rib projecting inwardly from said plate and including an inner flange flared inwardly to form a race, screws projected through the shell and threaded into the plate, and a ball positioned between the races and held under tension by adjustments of said screws.

3. The structure according to claim 2, in combination with a metal ring located in the channel of the first mentioned rib and held in place by the flared edge of the inner flange of said rib.

4. As an article of manufacture, a mirror head structure including a concavo-convex shell having a central hole, a channelled annular rib projecting outwardly from said shell and surrounding said hole and including an inner flange having its free edge flared outwardly, and a plurality of radial ribs, substantially angular in cross section, projecting outwardly from the convex surface of the shell and extending from the annular rib to locations short of the perimeter of said shell, said radial ribs merging with the annular rib to strengthen the latter.

LIVINGSTON ERIC JONES.

REFERENCES CITED

The following references are of record in the file of this patent:

UNITED STATES PATENTS

| Number | Name | Date |
|---|---|---|
| 1,239,520 | Reeves | Sept. 11, 1917 |
| 1,294,583 | Whisler et al. | Feb. 18, 1919 |
| 1,194,772 | Newman et al. | Aug. 15, 1916 |
| 2,089,463 | Ritz-Woller et al. | Oct. 10, 1937 |
| 2,161,433 | Ritz-Woller | June 6, 1939 |
| 2,202,697 | La Hodny | May 28, 1940 |
| 2,248,833 | Thibault et al. | July 8, 1941 |
| 2,439,009 | Kujawski | Apr. 6, 1948 |